(12) United States Patent
Konishi (10) Patent No.: US 10,981,095 B2
(45) Date of Patent: Apr. 20, 2021

(54) NONWOVEN FABRIC AND AIR FILTER INCLUDING SAME (71) Applicant: ENEOS Corporation, Tokyo (JP)

(72) Inventor: Hiroaki Konishi, Tokyo (JP)

(73) Assignee: ENEOS Corporation

(*) Notice: Subject to any disclaimer, the term of this patent is extended or adjusted under 35 U.S.C. 154(b) by 315 days.

(21) Appl. No.: 15/759,736

(22) PCT Filed: Jun. 20, 2016

(86) PCT No.: PCT/JP2016/068276
§ 371 (c)(1),
(2) Date: Jun. 11, 2018

(87) PCT Pub. No.: WO2017/047185
PCT Pub. Date: Mar. 23, 2017

(65) Prior Publication Data
US 2018/0353883 A1     Dec. 13, 2018

(30) Foreign Application Priority Data

Sep. 15, 2015 (JP) .............................. JP2015-181844

(51) Int. Cl.
*B01D 39/16* (2006.01)
*D04H 3/016* (2012.01)

(52) U.S. Cl.
CPC ......... *B01D 39/1623* (2013.01); *D04H 3/016* (2013.01); *B01D 2239/0216* (2013.01);
(Continued)

(58) Field of Classification Search
CPC ........ B01D 39/1623; B01D 2239/0618; B01D 2239/065; B01D 2239/1208;
(Continued)

(56) References Cited

U.S. PATENT DOCUMENTS

2009/0117803 A1   5/2009  Jung et al.
2010/0200494 A1*  8/2010  Storer .............. B01D 39/1623
                                                210/510.1
(Continued)

FOREIGN PATENT DOCUMENTS

EP    2103723 A1    9/2009
JP    2007023391 A  2/2007
(Continued)

OTHER PUBLICATIONS

Extended European Search Report and Written Opinion for EP Application No. 16846058.2, dated Feb. 18, 2019.
(Continued)

*Primary Examiner* — Jason M Greene
(74) *Attorney, Agent, or Firm* — Lerner, David, Littenberg, Krumholz & Mentlik, LLP (57) ABSTRACT

A nonwoven fabric according to the present invention is formed so that constituent fibers of the nonwoven fabric have an average fiber diameter of less than 1 μm and the number of fibers having fiber diameters ranging from 2 times up to 10 times the average fiber diameter of the constituent fibers is in a range of 2 to 20% of a total number of the constituent fibers. When the nonwoven fabric according to the present invention is used as a filter layer constituting an air filter, for example, it is possible to achieve high collection efficiency while reducing clogging (packing) between fibers to solve problems that may occur in using the conventional nanofiber nonwoven fabric (such as an increase in pressure loss and a decrease in service life).

3 Claims, 4 Drawing Sheets

(52) U.S. Cl.
CPC .............. *B01D 2239/065* (2013.01); *B01D 2239/0618* (2013.01); *B01D 2239/125* (2013.01); *B01D 2239/1208* (2013.01); *B01D 2239/1233* (2013.01); *D10B 2505/04* (2013.01)

(58) Field of Classification Search
CPC ...... B01D 2239/1233; B01D 2239/125; D04H 3/016; D10B 2505/04
See application file for complete search history.

(56) References Cited

U.S. PATENT DOCUMENTS

| | | | |
|---|---|---|---|
| 2010/0285101 A1 | 11/2010 | Moore et al. | |
| 2011/0174158 A1* | 7/2011 | Walls | B01D 39/1623 96/60 |
| 2012/0137885 A1* | 6/2012 | Dullaert | B01D 39/1623 96/12 |
| 2012/0187593 A1 | 7/2012 | Jung et al. | |
| 2015/0061175 A1 | 3/2015 | Jung et al. | |
| 2015/0107457 A1 | 4/2015 | Huang et al. | |
| 2016/0038864 A1* | 2/2016 | Calcaterra | B01D 39/1623 210/767 |
| 2018/0236392 A1* | 8/2018 | Murakami | B01D 39/1623 |

FOREIGN PATENT DOCUMENTS

| | | |
|---|---|---|
| JP | 2009531554 A | 9/2009 |
| JP | 2010236133 A | 10/2010 |
| JP | 2011508113 A | 3/2011 |
| WO | 2012102398 A1 | 8/2012 |
| WO | 2012114831 A1 | 8/2012 |

OTHER PUBLICATIONS

Japanese Office Action for JP Application No. 2015181844, dated Nov. 6, 2018.
International Search Report for PCT/JP2016/068276 dated Sep. 13, 2016.

* cited by examiner

NONWOVEN FABRIC AND AIR FILTER INCLUDING SAME

CROSS-REFERENCE TO RELATED APPLICATIONS

The present application is a national phase entry under 35 U.S.C. § 371 of International Application No. PCT/JP2016/068276, filed Jun. 20, 2016, published in Japanese, which claims priority from Japanese Patent Application No. 2015-181844, filed Sep. 15, 2015, the disclosures of which are hereby incorporated herein by reference.

TECHNICAL FIELD

The present invention relates to a nonwoven fabric, and more specifically, relates to a nonwoven fabric made of nanofibers and an air filter including the nonwoven fabric.

BACKGROUND ART

Recently, air pollution due to PM 2.5 (particulate matter with diameters of 2.5 μm or less) and the like, has become a problem, and air filters for collecting them have been developed to an increasing extent. As a material used for such air filters, a nonwoven fabric made of nanofibers having fiber diameters of less than 1 μm (nanofiber nonwoven fabric) has been focused on.

Nanofibers are a unique material that has functions due to nanoscale diameter and is easy to handle due to length on a large scale. Representative characteristics of nanofibers include: (1) large specific surface area (super-specific surface area effect); (2) nanoscale size (nanosize effect); and (3) molecules aligning in fiber (molecular orientation effect), and the like.

Because nanofibers have the characteristics (1) and (2), a nanofiber nonwoven fabric is considered to be suitable as a material for an air filter. That is, (1) since the specific surface area of fibers constituting a nonwoven fabric is large, the contact probability of fine particles and the fibers increases. In addition, the collection efficiency can be greatly improved by electret processing or the like. (2) Since the size is nanoscale, interfiber space formed by intersection of nanofibers is small, and it is possible to trap even smaller particles.

An electrospinning method is known as a method for manufacturing a nanofiber nonwoven fabric. In the electrospinning method, a high voltage is applied between a polymer solution and a collector, so that the electric field causes the solution to be ejected, and at this time, a solvent volatilizes, to generate nanofibers. The generated nanofibers are collected on the collector to form a nanofiber nonwoven fabric (see, for example, Patent Document 1).

REFERENCE DOCUMENT LIST

Patent Document

Patent Document 1: JP 2010-236133 A

SUMMARY OF THE INVENTION

Problems to be Solved by the Invention

Such a nanofiber nonwoven fabric manufactured by the electrospinning method has a characteristic that the fiber diameter distribution of nanofibers constituting the nanofiber nonwoven fabric is sharp (narrow). Therefore, when the nanofiber nonwoven fabric manufactured by the electrospinning method is used to form an air filter, nanofibers (fibers) can be easily clogged (that is, packing can easily occur), resulting in a decrease in air permeability and an increase in pressure loss. In addition, since clogging can easily occur, there have been problems in that the pressure loss may easily increase and the service life of air filter may be shortened.

In view of the above, an object of the present invention is to provide a nonwoven fabric capable of solving the above-mentioned problems of the conventional nanofiber nonwoven fabric (i.e., increase in pressure loss and decrease in service life), while achieving high collection efficiency and reducing clogging (packing) between fibers.

Means for Solving the Problem

A nonwoven fabric according to one aspect of the present invention, is formed so that constituent fibers of the nonwoven fabric have an average fiber diameter of less than 1 μm and the number of fibers having fiber diameters ranging from 2 times up to 10 times the average fiber diameter of the constituent fibers is in a range of 2 to 20% of a total number of the constituent fibers.

Effects of the Invention

When the above nonwoven fabric is used to form an air filter, for example, it is possible to achieve high collection efficiency while reducing clogging (packing) between fibers to solve the problems regarding the pressure loss and the service life. Therefore, when the nonwoven fabric is used to form an air filter, it is possible to appropriately balance the collection efficiency and service life of the air filter, compared with the conventional nanofiber nonwoven fabric, and in particular, it is possible to achieve a long service life of the air filter.

MODE FOR CARRYING OUT THE INVENTION

First, the outline of the present invention will be described. The present invention provides a so-called nanofiber nonwoven fabric. In the nonwoven fabric according to the present invention, fibers (constituent fibers) constituting the nonwoven fabric have an average fiber diameter of less than 1 μm. Fibers having fiber diameters of 1 μm or more (i.e., fibers which do not correspond to nanofibers) may be contained as long as the constituent fibers have an average fiber diameter of less than 1 μm. The constituent fibers may have an average fiber diameter of less than 0.5 μm.

The nonwoven fabric according to the present invention may form one or more nonwoven-fabric "layers" in a multilayer or a composite nonwoven fabric. For example, a nonwoven fabric can be formed by multilayering nonwoven fabrics according to the present invention and/or by laminating a nonwoven fabric according to the present invention on a predetermined nonwoven fabric substrate. Therefore, a so-called nonwoven-fabric "layer" is also the nonwoven fabric of the present invention.

The nonwoven fabric according to the present invention may be suitable for an application for an air filter that removes foreign matter, for example, fine particulate matter such as PM 2.5, from the air. For example, one or more nonwoven fabric according to the present invention may be used as one or more filter layers for constituting the air filter. That is, the air filter may include at least two nonwoven fabrics according to the present invention and/or a nonwoven fabric according to the present invention together with an additional nonwoven fabric. The nonwoven fabric according to the present invention contains fibers having fiber diameters ranging from 2 times up to 10 times the average fiber diameter (less than 1 μm) of the constituent fibers (that is, relatively thick fibers) at a predetermined ratio. Specifically, in the nonwoven fabric according to the present invention, the fibers having fiber diameters ranging from 2 times up to 10 times the average fiber diameter is in a range of 2 to 20% of the total number of the constituent fibers (total number of fibers). In the application for an air filter, since the nonwoven fabric according to the present invention has this configuration, it is possible to achieve a practically sufficient collection efficiency, while achieving improved pressure loss by increasing an air permeability, and extended service life of the air filter, as compared with the conventional nanofiber nonwoven fabric.

The air filter may be any air filter that removes fine particulate matter from the air, and examples of the air filter include, but are not limited to, a filter for coarse dust, a medium high efficiency filter, a HEPA filter, a ULPA filter, a gas removal filter, a mask, an air element, an air conditioner filter, and a filter for an air purifier.

Next, a nonwoven fabric, more specifically, a nonwoven fabric made of nanofibers, according to an embodiment of the present invention will be described. For example, the nonwoven fabric according to the embodiment of the present invention may be manufactured by using a device in which a raw filament feeding means and a drawing chamber are connected by an orifice, and a pressure difference between an inlet and an outlet of the orifice is at least 20 kPa. That is, the raw filament feeding means feeds out a raw filament, and the fed raw filament passes through the orifice and is guided to the drawing chamber. In the drawing chamber, the raw filament which has come out from the orifice is irradiated with a laser. This causes the raw filament to be continuously melted and subjected to drawing to produce nanofibers. Then, the produced nanofibers are collected in a sheet form to form the nonwoven fabric (that is, nonwoven fabric made of nanofibers) according to the embodiment. This will be described in detail hereinbelow.

In the present embodiment, a multi-flat yarn (multifilament) is used as the raw filament. Herein, the raw filament therefore may be referred to as a multifilament. The multi-flat yarn (multifilament) refers to a bundle of a plurality of single-flat yarns (monofilaments). The cross-sectional shape of one monofilament constituting the multifilament is not particularly limited. That is, the monofilament may be various modified flat yarns having cross-sections of an elliptical shape, a quadrilateral shape, a triangle, a trapezoid, and other polygonal shapes, as well as a flat yarn having a circular cross-sectional shape. As the monofilament, a composite flat yarn, such as a hollow fiber, a sheath-core flat yarn, a side-by-side type flat yarn, may be used. Furthermore, monofilaments constituting a multifilament need not all be the same. Monofilaments of different shapes and materials may be combined to form a multifilament.

In the present embodiment, a multifilament in which at least ten monofilaments are bundled is used as a raw filament. The number of monofilaments to be bundled depends on the orifice to be used, and specifically, the number of monofilaments may be appropriately adjusted so that the ratio of the total cross-sectional area S2 of the multifilaments to the cross-sectional area S1 of a straightening portion of the orifice (i.e., S2/S1) is within an appropriate range. A multifilament obtained by bundling, preferably, at least 20 monofilaments, and more preferably, at least 40 monofilaments, is used as a raw filament. Preferably, diameters of monofilaments constituting a multifilament range from 10 to 200 μm. A multifilament is normally twisted so that a plurality of monofilaments does not lose integrity as a bundle. The number of twists may be appropriately adjusted depending on the number, shape, material, or the like, of monofilaments (usually at least 20 times/m).

A resin that can be used for a multifilament is a thermoplastic resin capable of being processed into a yarn. Examples of the resin that can be used for a multifilament include, polyester including polyethylene terephthalate and polylactic acid, polyamide including nylon (nylon 6, nylon 66), polyolefin including polypropylene and polyethylene, polyvinyl alcohol polymer, acrylonitrile polymer, fluoropolymer including tetrafluoroethylene-perfluoroalkylvinylether copolymer (PFA) or the like, a urethane polymer, a vinyl chloride polymer, a styrene polymer, a (meth) acrylic polymer, a polyoxymethylene, an ether ester polymer, a cellulose modified polymer including triacetyl cellulose, and the like. In particular, polyethylene terephthalate, polylactic acid, nylon (nylon 6, nylon 66) and polypropylene are suitable for production of nanofibers because of their good ability in drawing and good molecular orientation.

The multifilament or each monofilament constituting the multifilament may be mixed therein, or may be adhered to the surface thereof, various substances such as various organic substances, organometallic complexes, inorganic substances, or the like. In this case, the mixed and/or adhered substances can uniformly disperse while nanofibers are produced, and thus, it is possible to impart functions (functions depending on the substances) to the nanofibers.

The raw filament feeding means is a device for feeding out the raw filament (multifilament) to the orifice. The raw filament feeding means may be any device that feeds out the multifilament at a constant delivery speed, and its configuration and the like are not particularly limited. Until the multifilament is fed into the orifice, in other words, up to the inlet of the orifice, a pressure is in pressure P1, and the portion under pressure P1 is hereinafter referred to as a "raw filament feeding chamber".

In a portion located after the outlet of the orifice, the pressure is maintained at pressure P2 that is lower than pressure P1, and the portion after the outlet constitutes the "drawing chamber" in which the multifilament coming out of the orifice is heated by laser irradiation to melt a leading end portion, followed by drawing. A pressure difference (P1−P2) between the raw filament feeding chamber of pressure P1 and the drawing chamber of pressure P2 causes in the orifice an airflow flowing from the inlet to the outlet of the orifice. This air flow generated in the orifice causes a multifilament which has fed into the orifice to pass through the orifice into the drawing chamber. It should be noted that P1≥2×P2 is preferable, P1≥3×P2 is more preferable, and P1≥5×P2 is most preferable. Specifically, the pressure difference between P1 and P2 (P1−P2) is preferably at least 20 kPa, and is more preferable at least 50 kPa.

Here, it may be particularly preferable that P1 be set to atmospheric pressure and P2 be set to a pressure lower than the atmospheric pressure, because this can lead to relatively easy construction of the device. The temperatures of the raw filament feeding chamber and the drawing chamber are usually set to room temperature (ambient temperature). However, when it is desired to preheat the multifilament or to heat-treat the filament after drawing, heating air may be appropriately used. In order to prevent the filaments from being oxidized, an inert gas such as nitrogen gas may be used. In order to prevent a water content from being undesirably released, a gas containing water vapor or a water content may be used. In addition, for the purpose of controlling vibrations of the multifilament described later, various other inert gases may also be used.

Figure 1:
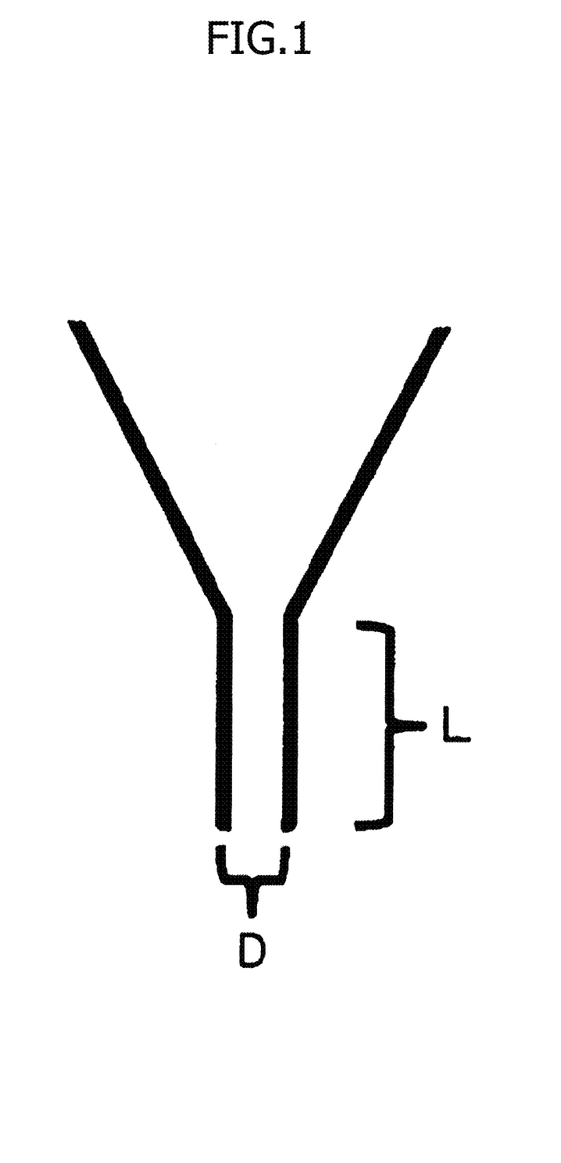
FIG. 1 is a view illustrating an example of an orifice for use in a device for manufacturing a nonwoven fabric made of nanofibers according to an embodiment.

Preferably, as illustrated in FIG. 1, the orifice includes a tapered introducing portion and a straight-tubular straightening portion. A ratio (L/D) of length L of the straightening portion to diameter D of the straightening portion is in a range of 1 to 100, preferably in a range of 1 to 50, and more preferably in a range of 1 to 10. The straightening portion may be appropriately subjected to processing for adjusting an air flow or the like, depending on the number, shape, material, or the like of monofilaments in a multifilament, for which the straightening portion is to be used.

The raw filament feeding chamber and the drawing chamber are connected by the orifice, and in the orifice, a high-speed airflow corresponding to the pressure difference (P1−P2) is generated in a narrow clearance between the multifilament and the orifice. In order to sufficiently generate the high-speed airflow, it is necessary to set a ratio of total cross-sectional area S2 of the multifilament to cross-sectional area S1 of the orifice straightening portion (that is, S2/S1, hereinafter referred to as "orifice coverage") to be 50% or less. This is because if the orifice coverage (S2/S1) is greater than 50%, the amount of the high-speed airflow flowing through the orifice becomes insufficient and vibrations of the multifilament (described below) cannot be obtained sufficiently. If vibrations of the multifilament are insufficient, a melted multifilament does not form a filament and thus falls as a molten mass, so that nanofibers cannot be obtained. On the other hand, if the orifice coverage (S2/S1) is less than 5%, vibrations of the multifilament become too large, or the force of the airflow does not properly apply to the multifilament, so that desired nanofibers cannot be obtained. Therefore, the orifice coverage (S2/S1) is required to be in a range of 5 to 50%, and preferably in a range of 10 to 35%.

Laser irradiation is performed on a multifilament which has passed through the orifice, and a tip portion of the multifilament is heated and melted. At this time, it is necessary to cause the multifilament to vibrate. Thus, laser irradiation conditions such as laser irradiation position, laser shape and laser power are appropriately adjusted.

Figure 2:
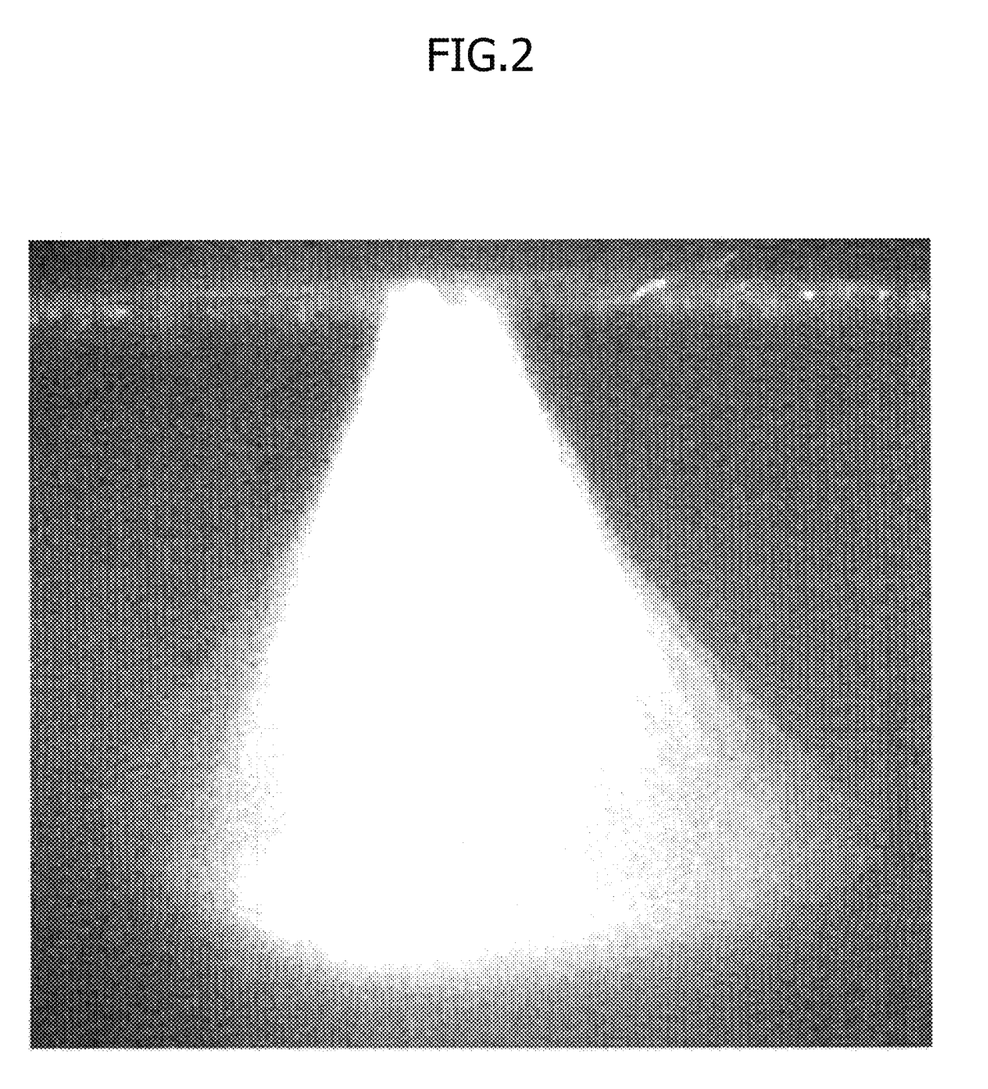
FIG. 2 is a view illustrating a vibrating state of a multifilament.
Figure 3:
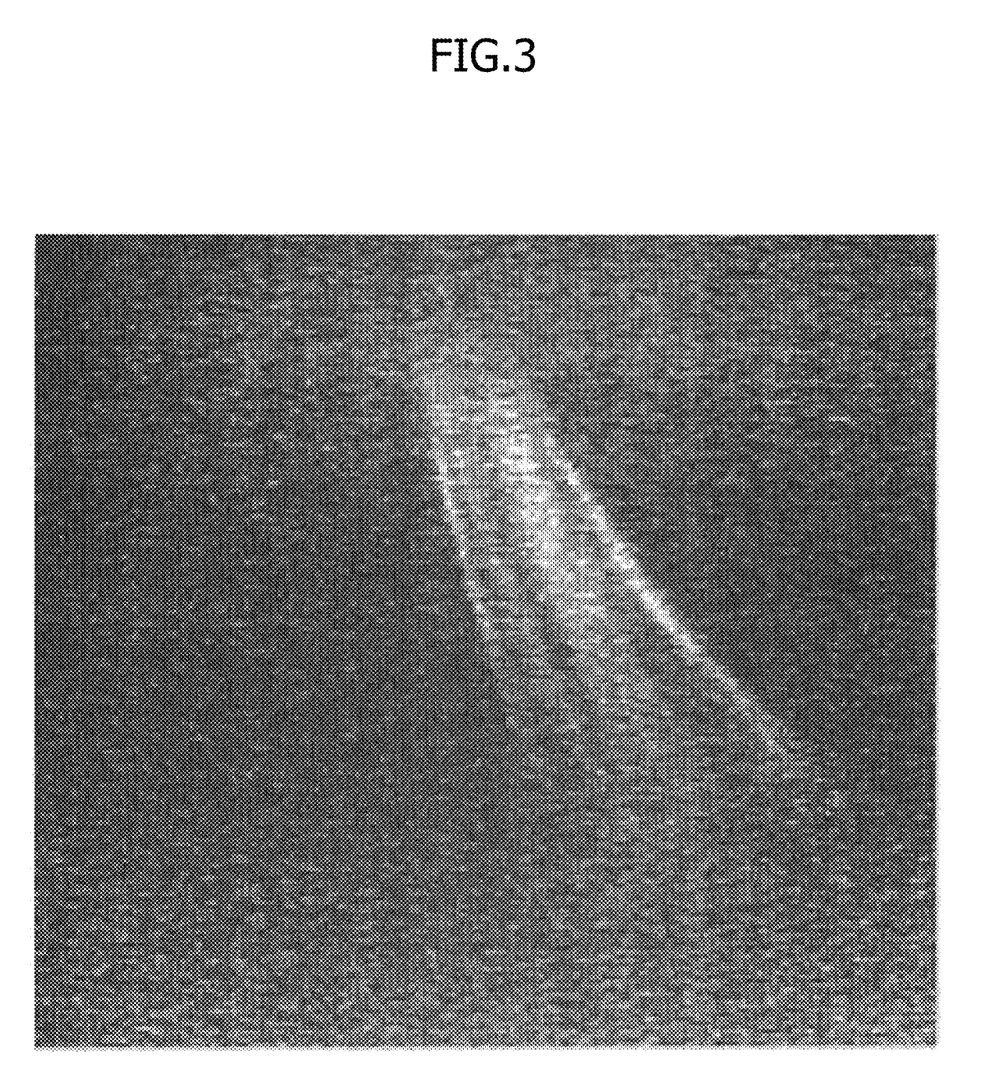
FIG. 3 is a view of the vibrating state of the multifilament, obtained by observing it with a high-speed camera.

FIG. 2 illustrates a vibrating state of a multifilament caused by the laser irradiation. Since the multifilament vibrates at a very high speed, it is visually observed as an after-image state as illustrated in FIG. 2. In order to analyze the vibrating state of the multifilament in more detail, a high-speed camera was used to carry out observation. As illustrated in FIG. 3, it was observed a bundle of monofilaments as a multifilament integrally and randomly sways within a conical space having the vertex at the orifice outlet (orifice hole).

To obtain nanofibers from a multifilament, it is necessary to vibrate the multifilament by laser irradiation. However, it is not merely necessary to vibrate the multifilament. In order to stably obtain desired nanofibers, it is necessary that angle of the multifilament (center of the bundle) at the time of vibrations (hereinafter referred to as the "vibration angle of the multifilament") is in a range of 5° to 80° with respect to the axis of the orifice. Preferably, the vibration angle of the multifilament may be in a range of 15° to 50°, and more preferably may be in a range of 20° to 40°.

Furthermore, the position irradiated with a laser is also important in vibrating the multifilament. Specifically, it is necessary to perform laser irradiation so that the center position of a molten portion of the multifilament is located right below the outlet of the orifice at a distance in a range of from 1 mm up to 15 mm from the outlet. If the molten portion of the multifilament is located at a distance of less than 1 mm from the outlet of the orifice, there is a concern that the vibration angle of the multifilament might exceed the upper limit of the above-mentioned range due to the airflow flowing out of the orifice, and if the molten portion of the multifilament is located at a distance of more than 15 mm from the outlet of the orifice, there is a concern that the airflow flowing out of the orifice might weaken so that the vibration angle of the multifilament might fall below the lower limit of the above-mentioned range. Preferably, the laser irradiation is performed so that the center position of the molten portion of the multifilament is located right below the outlet of the orifice at a distance in a range of from 3 mm up to 10 mm, and more preferably the laser irradiation may be performed so that the center position of the molten portion of the multifilament is located right below the outlet of the orifice at a distance in a range of from 3 mm up to 5 mm.

When the multifilament vibrates, satisfying the above-mentioned conditions, nanofibers having an average fiber diameter of less than 1 μm are obtained (produced) from the multifilament. Then, by collecting the obtained nanofibers in a sheet form, a nonwoven fabric made of the nanofibers is formed. Alternatively, the obtained nanofibers may be collected in a sheet form on a suitable nonwoven fabric substrate. In this case, a composite nonwoven fabric including the nonwoven fabric substrate and the nonwoven fabric made of the nanofibers is formed. Furthermore, to efficiently collect produced nanofibers in a sheet form, at least two of the above-described orifices may be arranged, for example. In this case, spacing of the orifices may be appropriately adjusted to prevent vibrating multifilaments from coming into contact with each other and/or to prevent adverse effects which may be caused by airflows of adjacent orifices.

In the above-described method for manufacturing the nonwoven fabric made of the nanofibers, the average fiber diameter and the fiber diameter distribution of the resulting nanofibers, that is, the fibers constituting the nonwoven fabric can be adjusted by changing the raw filament (multifilament) to be used, the feed rate of the raw filament (multifilament), the orifice shape, the laser irradiation conditions, and/or the pressure difference (P1−P2) between the raw filament feeding chamber and the drawing chamber. Therefore, for example, when manufacturing a nonwoven fabric made of nanofibers for an air filter, the raw filament, the feed rate of the raw filament, the orifice shape, the laser irradiation conditions and/or the pressure difference (P1−P2) are selected or determined so that the constituent fibers include fibers having fiber diameters ranging from 2 times up to 10 times an average fiber diameter of the constituent fibers (that is, relatively thick fibers) at a predetermined ratio.

Figure 4:
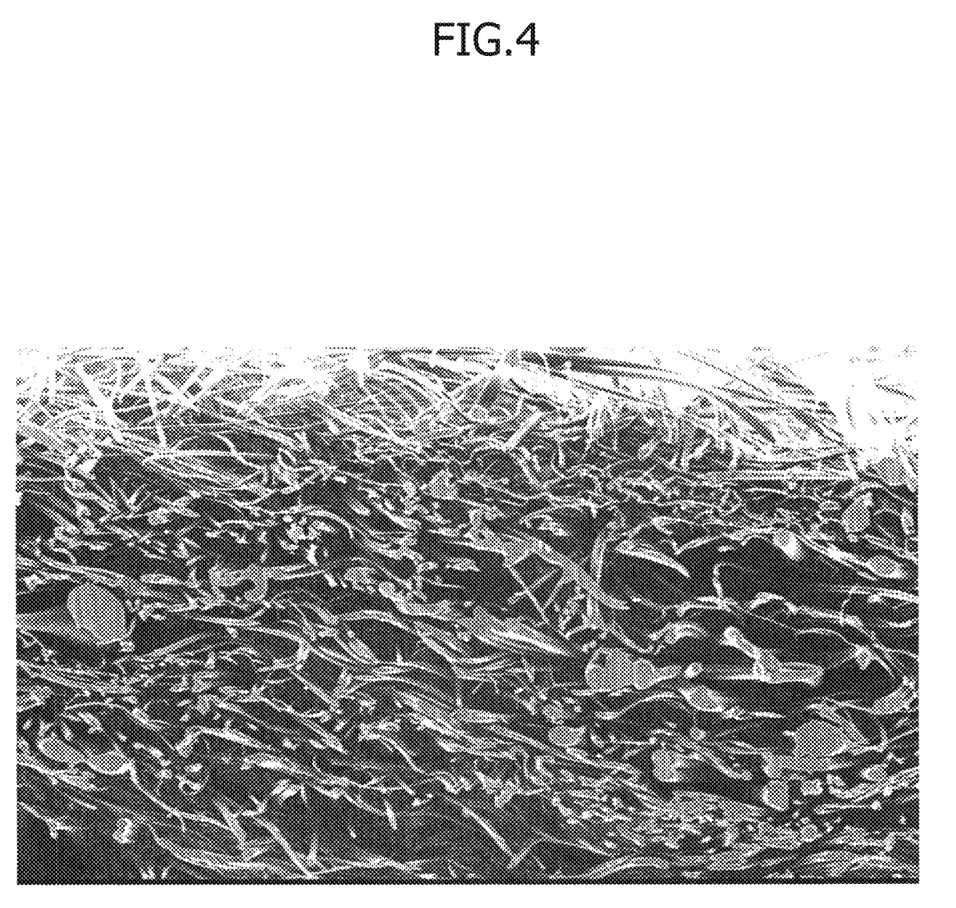
FIG. 4 is an example photograph of a cross-section of a nonwoven fabric made of nanofibers, manufactured for an air filter.

FIG. 4 is an example photograph of a cross-section of a nonwoven fabric made of nanofibers manufactured for an air filter. Referring to FIG. 4, it can be observed that extremely fine fibers and thick fibers are mixed in the nonwoven fabric made of nanofibers manufactured for an air filter.

EXAMPLES

Hereinbelow, the nonwoven fabric according to the present invention will be described more specifically with reference to Examples. However, the following Examples do not limit the present invention at all. Values in Examples and Comparative Examples were obtained by the following methods.

(1) Average Fiber Diameters

A surface of a manufactured nonwoven fabric was photographed (magnification: 4000 times) with a scanning electron microscope (JCM-5000, manufactured by JEOL Ltd.). Twenty photographs were randomly selected. The number of fibers in a photograph was counted and diameters of all the fibers were measured. Data of 20 photographs was handled as one piece of data and an average value of the fiber diameters was determined based on the total number of fibers indicated in the 20 photographs and the fiber diameters of all the fibers. The average value was taken as the average fiber diameter of the constituent fibers of the nonwoven fabric.

(2) Fiber Diameter Distribution

After obtaining the average fiber diameter in (1), the number of fibers in 20 photographs, having fiber diameters ranging from 2 times up to 10 times an average fiber diameter was counted, and a percentage of the counted number of fibers having fiber diameters ranging from 2 times up to 10 times an average fiber diameter, to the total number of fibers (total number of fibers indicated in 20 photographs) was calculated.

(3) Porosities

The porosity of a nonwoven fabric was calculated by the following formula.

Porosity (%)=100−{basis weight g/m$^2$×100/resin density g/cm$^3$/thickness μm}

(4) Air Filter Test

The manufactured nonwoven fabric was evaluated by a filter performance tester (DFT-4, manufactured by Tokyo Dylec Corporation). Test particles of 11 species (product of baked Kanto loam) defined in Japanese Industrial Standards (JIS) were used, and the test wind speed was 5.3 cm/s. The collection efficiency was calculated using a light scattering particle counter. For particles of 2.5 μm or less, the collection efficiency was calculated for each particle diameter range, and an average value was taken as the collection efficiency of the nonwoven fabric. A service life test was carried out with a particle concentration of 2500 μg/m$^3$.

Example 1-1

A multifilament (570 dtex, 60 filaments) made of polypropylene was prepared as a multifilament, which is a raw filament. An orifice having a straightening portion with the inner diameter of 0.6 mm and the length of 2.4 mm, was used, and 30 orifices were arranged at 10-mm intervals. The orifice coverage was set to 20%, the multifilament was fed at 0.3 m/min in a state in which the degree of vacuum of the drawing chamber was 30 kPa. The multifilament was irradiated with a 500 W, 3 mm×30 mm rectangular laser so that the center position of a molten portion of the multifilament was located 3.8 mm below the orifice. At this time, the multifilament vibrated at an orifice outlet at a vibration angle of 27 degrees, and the produced nanofiber was received by a nonwoven fabric substrate, to obtain a composite nonwoven fabric. The resulting composite nonwoven fabric was wound after being subjected to a nip treatment. In the resulting composite nonwoven fabric, more specifically, in the nonwoven fabric made of the nanofibers formed on the nonwoven fabric substrate, the average fiber diameter of the nanofibers was 310 nm, and the number of fibers having fiber diameters ranging from 2 times up to 10 times the average fiber diameter was 2% of the total number of fibers. The porosity of the nonwoven fabric was 85%.

The air filter test was carried out using the resulting composite nonwoven fabric (basis weight of nanofibers: 6 g/m$^2$). The initial collection efficiency was 99.6%, and the initial pressure loss was 140 Pa. In the service life test, the time until the pressure loss increases by 150 Pa from the initial pressure loss was 106 minutes.

Example 1-2

A multifilament (570 dtex, 60 filaments) made of polypropylene was prepared as a multifilament, which is a raw filament. An orifice having a straightening portion with the inner diameter of 0.6 mm and the length of 1.2 mm, was used, and 30 orifices were arranged at 10-mm intervals. The orifice coverage was set to 20%, the multifilament was fed at 0.3 m/min in a state in which the degree of vacuum of the drawing chamber was 20 kPa. The multifilament was irradiated with a 500 W, 3 mm×30 mm rectangular laser so that the center position of a molten portion of the multifilament was located 3.5 mm below the orifice. At this time, the multifilament vibrated at an orifice outlet at a vibration angle of 32 degrees, and the produced nanofiber was received by a nonwoven fabric substrate, to obtain a composite nonwoven fabric. The resulting composite nonwoven fabric was wound after being subjected to a nip treatment. In the resulting composite nonwoven fabric, more specifically, in the nonwoven fabric made of the nanofibers formed on the nonwoven fabric substrate, the average fiber diameter of the nanofibers was 330 nm, and the number of fibers having fiber diameters ranging from 2 times up to 10 times the average fiber diameter was 7% of the total number of fibers. The porosity of the nonwoven fabric was 85%.

The air filter test was carried out using the resulting composite nonwoven fabric (basis weight of nanofibers: 6 g/m$^2$). The initial collection efficiency was 99.1%, and the initial pressure loss was 131 Pa. In the service life test, the time until the pressure loss increases by 150 Pa from the initial pressure loss was 135 minutes.

Example 1-3

A multifilament (830 dtex, 25 filaments) made of polypropylene was prepared as a multifilament, which is a raw filament. An orifice having a straightening portion with the inner diameter of 0.8 mm and the length of 1.6 mm, was used, and 30 orifices were arranged at 10-mm intervals. The orifice coverage was set to 24%, the multifilament was fed at 0.3 m/min in a state in which the degree of vacuum of the drawing chamber was 15 kPa. The multifilament was irradiated with an 800 W, 3 mm×30 mm rectangular laser so that the center position of a molten portion of the multifilament was located 3.5 mm below the orifice. At this time, the multifilament vibrated at an orifice outlet at a vibration angle of 35 degrees, and the produced nanofiber was received by a nonwoven fabric substrate, to obtain a composite nonwoven fabric. The resulting composite nonwoven fabric was wound after being subjected to a nip treatment. In the resulting composite nonwoven fabric, more specifically, in the nonwoven fabric made of the nanofibers formed on the nonwoven fabric substrate, the average fiber diameter of the nanofibers was 345 nm, and the number of fibers having fiber diameters ranging from 2 times up to 10 times the average fiber diameter was 13% of the total number of fibers. The porosity of the nonwoven fabric was 85%.

The air filter test was carried out using the resulting composite nonwoven fabric (basis weight of nanofibers: 6 g/m$^2$). The initial collection efficiency was 98.5%, and the initial pressure loss was 119 Pa. In the service life test, the time until the pressure loss increases by 150 Pa from the initial pressure loss was 170 minutes.

Example 1-4

A multifilament (830 dtex, 25 filaments) made of polypropylene was prepared as a multifilament, which is a raw filament. An orifice having a straightening portion with the inner diameter of 0.9 mm and the length of 0.9 mm, was used, and 30 orifices were arranged at 10-mm intervals. The orifice coverage was set to 19%, the multifilament was fed at 0.3 m/min in a state in which the degree of vacuum of the drawing chamber was 10 kPa. The multifilament was irradiated with an 800 W, 3 mm×30 mm rectangular laser so that the center position of a molten portion of the multifilament was located 3.3 mm below the orifice. At this time, the multifilament vibrated at an orifice outlet at a vibration angle of 40 degrees, and the produced nanofiber was received by a nonwoven fabric substrate, to obtain a composite nonwoven fabric. The resulting composite nonwoven fabric was wound after being subjected to a nip treatment. In the resulting composite nonwoven fabric, more specifically, in the nonwoven fabric made of the nanofibers formed on the nonwoven fabric substrate, the average fiber diameter of the nanofibers was 340 nm, and the number of fibers having fiber diameters ranging from 2 times up to 10 times the average fiber diameter was 20% of the total number of fibers. The porosity of the nonwoven fabric was 85%.

The air filter test was carried out using the resulting composite nonwoven fabric (basis weight of nanofibers: 6 g/m$^2$). The initial collection efficiency was 94%, and the initial pressure loss was 101 Pa. In the service life test, the time until the pressure loss increases by 150 Pa from the initial pressure loss was 230 minutes.

Comparative Example 1-1

A multifilament (830 dtex, 25 filaments) made of polypropylene was prepared as a multifilament, which is a raw filament. An orifice having a straightening portion with the inner diameter of 1.0 mm and the length of 1.0 mm, was used, and 30 orifices were arranged at 10-mm intervals. The orifice coverage was set to 15%, the multifilament was fed at 0.3 m/min in a state in which the degree of vacuum of the drawing chamber was 10 kPa. The multifilament was irradiated with an 800 W, 3 mm×30 mm rectangular laser so that the center position of a molten portion of the multifilament was located 3.3 mm below the orifice. At this time, the multifilament vibrated at an orifice outlet at a vibration angle of 45 degrees, and the produced nanofiber was received by a nonwoven fabric substrate, to obtain a composite nonwoven fabric. The resulting composite nonwoven fabric was wound after being subjected to a nip treatment. In the resulting composite nonwoven fabric, more specifically, in the nonwoven fabric made of the nanofibers formed on the nonwoven fabric substrate, the average fiber diameter of the nanofibers was 370 nm, and the number of fibers having fiber diameters ranging from 2 times up to 10 times the average fiber diameter was 26% of the total number of fibers. The porosity of the nonwoven fabric was 85%.

The air filter test was carried out using the resulting composite nonwoven fabric (basis weight of nanofibers: 6 g/m$^2$). The initial collection efficiency was 77%, and the initial pressure loss was 61 Pa. In the service life test, the time until the pressure loss increases by 150 Pa from the initial pressure loss was 352 minutes.

Comparative Example 1-2

By using the electrospinning method, PVDF nanofibers were formed on the same nonwoven fabric substrate as that used in Examples 1-1 to 1-4 and Comparative Example 1-1. The resulting composite nonwoven fabric, more specifically, in the nonwoven fabric made of the nanofibers formed on the nonwoven fabric substrate, the average fiber diameter of the nanofibers was 100 nm, and no fiber having fiber diameters ranging from 2 times up to 10 times the average fiber diameter was contained (the number of fibers was 0% of the total number of fibers). The porosity of the nonwoven fabric could not be determined because of low basis weight.

The air filter test was carried out using the resulting composite nonwoven fabric (basis weight of nanofibers: 0.5 g/m$^2$). The initial collection efficiency was 99.99%, and the initial pressure loss was 170 Pa. In the service life test, the time until the pressure loss increases by 150 Pa from the initial pressure loss was 40 minutes.

From the results of the air filter tests using Examples 1-1 to 1-4 and Comparative Example 1-1, it was found that the rate of change of each of the initial collection efficiency, the initial pressure loss, and the time required until the pressure loss increases, increases when the ratio of the number of fibers having fiber diameters ranging from 2 times up to 10 times the average fiber diameter (hereinafter, simply referred to as "the ratio of thick fibers") exceeds 20%. In particular, regarding the initial collection efficiency, the initial collection efficiencies in Examples 1-1 to 1-4 exceeded 90%, whereas in Comparative Example 1-1, the initial collection efficiency was low and in the 70% level, being largely different from those of Examples 1-1 to 1-4.

From the above, when a nonwoven fabric including constituent fibers with an average fiber diameter in a range of 300 to 400 nm, and having a porosity of 85% (some variation can be tolerated), is applied to an air filter, it may be preferable to set the ratio of thick fibers to be in a range of 2 to 20% because this can lead the initial collection efficiency to be stable, and can also lead the initial pressure loss and the time required until the pressure loss increases to be stable.

In addition, in each of Examples 1-1 to 1-4, the initial collection efficiency (>90%) is comparable to that of Comparative Example 1-2, and furthermore, comparing with Comparative Example 1-2, the initial pressure loss in each of Examples 1-1 to 1-4 is low, and the time required until the pressure loss increases is sufficiently long. That is, when a nonwoven fabric including constituent fibers with the average fiber diameter in a range of 300 to 400 nm, has the ratio of thick fibers in a range of 2 to 20% and the porosity of 85%

(some variation can be tolerated), and when this nonwoven fabric is applied to an air filter, the air filter can exhibit the collection efficiency equal to or close to that of a nanofiber nonwoven fabric manufactured by the electrospinning method, and can solve the problems that may occur in using the nanofiber nonwoven fabric manufactured by the electrospinning method, that is, (a) large pressure loss, and (b) short filter life.

Generally, a nonwoven fabric made of constituent fibers having an average fiber diameter of less than 1 µm has a collection efficiency sufficiently high for practical use. In addition, a nonwoven fabric for forming an air filter can be appropriately selected, for example, depending on the size of fine particulate matter as the main object to be collected by the air filter and/or depending on an additional nonwoven fabric to be used together. Therefore, for example, when particulate matter to be mainly collected by the air filter is larger than the test particles used in the air filter test or when the air filter is formed together with an additional nonwoven fabric, it is not always necessary to obtain a high initial collection efficiency (for example, 90% or more) in the air filter test. For a nonwoven fabric for an air filter, it is rather important that the initial collection efficiency and the like be stable. Hereinbelow, Examples based on such a viewpoint will be described.

Example 2-1

A multifilament (570 dtex, 60 filaments) made of polypropylene was prepared as a multifilament, which is a raw filament. An orifice having a straightening portion with the inner diameter of 0.6 mm and the length of 2.4 mm, was used, and 30 orifices were arranged at 10-mm intervals. The orifice coverage was set to 20%, the multifilament was fed at 0.3 m/min in a state in which the degree of vacuum of the drawing chamber was 30 kPa. The multifilament was irradiated with a 500 W, 3 mm×30 mm rectangular laser so that the center position of a molten portion of the multifilament was located 3.8 mm below the orifice. At this time, the multifilament vibrated at an orifice outlet at a vibration angle of 27 degrees, and the produced nanofiber was received by a nonwoven fabric substrate, to obtain a composite nonwoven fabric. The resulting composite nonwoven fabric was wound after being subjected to a nip treatment. In the resulting composite nonwoven fabric, more specifically, in the nonwoven fabric made of the nanofibers formed on the nonwoven fabric substrate, the average fiber diameter of the nanofibers was 310 nm, and the number of fibers having fiber diameters ranging from 2 times up to 10 times the average fiber diameter was 2% of the total number of fibers. The porosity of the nonwoven fabric was 93%.

The air filter test was carried out using the resulting composite nonwoven fabric (basis weight of nanofibers: 6 g/m$^2$). The initial collection efficiency was 75.3%, and the initial pressure loss was 85 Pa. In the service life test, the time until the pressure loss increases by 150 Pa from the initial pressure loss was 269 minutes.

Example 2-2

A multifilament (570 dtex, 60 filaments) made of polypropylene was prepared as a multifilament, which is a raw filament. An orifice having a straightening portion with the inner diameter of 0.6 mm and the length of 1.2 mm, was used, and 30 orifices were arranged at 10-mm intervals. The orifice coverage was set to 20%, the multifilament was fed at 0.3 m/min in a state in which the degree of vacuum of the drawing chamber was 20 kPa. The multifilament was irradiated with a 500 W, 3 mm×30 mm rectangular laser so that the center position of a molten portion of the multifilament was located 3.5 mm below the orifice. At this time, the multifilament vibrated at an orifice outlet at a vibration angle of 32 degrees, and the produced nanofiber was received by a nonwoven fabric substrate, to obtain a composite nonwoven fabric. The resulting composite nonwoven fabric was wound after being subjected to a nip treatment. In the resulting composite nonwoven fabric, more specifically, in the nonwoven fabric made of the nanofibers formed on the nonwoven fabric substrate, the average fiber diameter of the nanofibers was 330 nm, and the number of fibers having fiber diameters ranging from 2 times up to 10 times the average fiber diameter was 7% of the total number of fibers. The porosity of the nonwoven fabric was 93%.

The air filter test was carried out using the resulting composite nonwoven fabric (basis weight of nanofibers: 6 g/m$^2$). The initial collection efficiency was 74.2%, and the initial pressure loss was 84 Pa. In the service life test, the time until the pressure loss increases by 150 Pa from the initial pressure loss was 281 minutes.

Example 2-3

A multifilament (830 dtex, 25 filaments) made of polypropylene was prepared as a multifilament, which is a raw filament. An orifice having a straightening portion with the inner diameter of 0.8 mm and the length of 1.6 mm, was used, and 30 orifices were arranged at 10-mm intervals. The orifice coverage was set to 24%, the multifilament was fed at 0.3 m/min in a state in which the degree of vacuum of the drawing chamber was 15 kPa. The multifilament was irradiated with an 800 W, 3 mm×30 mm rectangular laser so that the center position of a molten portion of the multifilament was located 3.5 mm below the orifice. At this time, the multifilament vibrated at an orifice outlet at a vibration angle of 35 degrees, and the produced nanofiber was received by a nonwoven fabric substrate, to obtain a composite nonwoven fabric. The resulting composite nonwoven fabric was wound after being subjected to a nip treatment. In the resulting composite nonwoven fabric, more specifically, in the nonwoven fabric made of the nanofibers formed on the nonwoven fabric substrate, the average fiber diameter of the nanofibers was 345 nm, and the number of fibers having fiber diameters ranging from 2 times up to 10 times the average fiber diameter was 13% of the total number of fibers. The porosity of the nonwoven fabric was 93%.

The air filter test was carried out using the resulting composite nonwoven fabric (basis weight of nanofibers: 6 g/m$^2$). The initial collection efficiency was 73%, and the initial pressure loss was 80 Pa. In the service life test, the time until the pressure loss increases by 150 Pa from the initial pressure loss was 299 minutes.

Example 2-4

A multifilament (830 dtex, 25 filaments) made of polypropylene was prepared as a multifilament, which is a raw filament. An orifice having a straightening portion with the inner diameter of 0.9 mm and the length of 0.9 mm, was used, and 30 orifices were arranged at 10-mm intervals. The orifice coverage was set to 19%, the multifilament was fed at 0.3 m/min in a state in which the degree of vacuum of the drawing chamber was 10 kPa. The multifilament was irradiated with an 800 W, 3 mm×30 mm rectangular laser so that the center position of a molten portion of the multifilament was located 3.3 mm below the orifice. At this time, the multifilament vibrated at an orifice outlet at a vibration angle of 40 degrees, and the produced nanofiber was received by a nonwoven fabric substrate, to obtain a composite nonwoven fabric. The resulting composite nonwoven fabric was wound after being subjected to a nip treatment. In the resulting composite nonwoven fabric, more specifically, in the nonwoven fabric made of the nanofibers formed on the nonwoven fabric substrate, the average fiber diameter of the nanofibers was 340 nm, and the number of fibers having fiber diameters ranging from 2 times up to 10 times the average fiber diameter was 20% of the total number of fibers. The porosity of the nonwoven fabric was 93%.

The air filter test was carried out using the resulting composite nonwoven fabric (basis weight of nanofibers: 6 g/m$^2$). The initial collection efficiency was 69%, and the initial pressure loss was 67 Pa. In the service life test, the time until the pressure loss increases by 150 Pa from the initial pressure loss was 351 minutes.

Comparative Example 2

A multifilament (830 dtex, 25 filaments) made of polypropylene was prepared as a multifilament, which is a raw filament. An orifice having a straightening portion with the inner diameter of 1.0 mm and the length of 1.0 mm, was used, and 30 orifices were arranged at 10-mm intervals. The orifice coverage was set to 15%, the multifilament was fed at 0.3 m/min in a state in which the degree of vacuum of the drawing chamber was 10 kPa. The multifilament was irradiated with an 800 W, 3 mm×30 mm rectangular laser so that the center position of a molten portion of the multifilament was located 3.3 mm below the orifice. At this time, the multifilament vibrated at an orifice outlet at a vibration angle of 45 degrees, and the produced nanofiber was received by a nonwoven fabric substrate, to obtain a composite nonwoven fabric. The resulting composite nonwoven fabric was wound after being subjected to a nip treatment. In the resulting composite nonwoven fabric, more specifically, in the nonwoven fabric made of the nanofibers formed on the nonwoven fabric substrate, the average fiber diameter of the nanofibers was 370 nm, and the number of fibers having fiber diameters ranging from 2 times up to 10 times the average fiber diameter was 26% of the total number of fibers. The porosity of the nonwoven fabric was 93%.

The air filter test was carried out using the resulting composite nonwoven fabric (basis weight of nanofibers: 6 g/m$^2$). The initial collection efficiency was 54%, and the initial pressure loss was 37 Pa. In the service life test, the time until the pressure loss increases by 150 Pa from the initial pressure loss was 453 minutes.

From the results of the air filter tests using Examples 2-1 to 2-4 and Comparative Example 2, it was found that the rate of change of each of the initial collection efficiency, the initial pressure loss, and the time required until the pressure loss increases, increases when the ratio of thick fibers exceeds 20%. In particular, regarding the initial collection efficiency, the initial collection efficiencies in Examples 2-1 to 2-4 are approximately 70%, whereas in Comparative Example 2, the initial collection efficiency was low and in the 50% level, being largely different from those of Examples 2-1 to 2-4.

From the above, when a nonwoven fabric including constituent fibers with average fiber diameters ranging from 300 to 400 nm, and having a porosity of 93% (some variation can be tolerated), is applied to an air filter, it may be preferable to set the ratio of thick fibers to be in a range of 2 to 20%.

Example 3-1

A multifilament (830 dtex, 15 filaments) made of polypropylene was prepared as a multifilament, which is a raw filament. An orifice having a straightening portion with the inner diameter of 0.9 mm and the length of 3.6 mm, was used, and 30 orifices were arranged at 10-mm intervals. The orifice coverage was set to 19%, the multifilament was fed at 0.6 m/min in a state in which the degree of vacuum of the drawing chamber was 30 kPa. The multifilament was irradiated with an 800 W, 3 mm×30 mm rectangular laser so that the center position of a molten portion of the multifilament was located 3.8 mm below the orifice. At this time, the multifilament vibrated at an orifice outlet at a vibration angle of 24 degrees, and the produced nanofiber was received by a nonwoven fabric substrate, to obtain a composite nonwoven fabric. The resulting composite nonwoven fabric was wound after being subjected to a nip treatment. In the resulting composite nonwoven fabric, more specifically, in the nonwoven fabric made of the nanofibers formed on the nonwoven fabric substrate, the average fiber diameter of the nanofibers was 810 nm, and the number of fibers having fiber diameters ranging from 2 times up to 10 times the average fiber diameter was 2% of the total number of fibers. The porosity of the nonwoven fabric was 85%.

The air filter test was carried out using the resulting composite nonwoven fabric (basis weight of nanofibers: 6 g/m$^2$). The initial collection efficiency was 65%, and the initial pressure loss was 61 Pa. In the service life test, the time until the pressure loss increases by 150 Pa from the initial pressure loss was 368 minutes.

Example 3-2

A multifilament (830 dtex, 15 filaments) made of polypropylene was prepared as a multifilament, which is a raw filament. An orifice having a straightening portion with the inner diameter of 0.9 mm and the length of 2.7 mm, was used, and 30 orifices were arranged at 10-mm intervals. The orifice coverage was set to 19%, the multifilament was fed at 0.6 m/min in a state in which the degree of vacuum of the drawing chamber was 20 kPa. The multifilament was irradiated with an 800 W, 3 mm×30 mm rectangular laser so that the center position of a molten portion of the multifilament was located 3.6 mm below the orifice. At this time, the multifilament vibrated at an orifice outlet at a vibration angle of 28 degrees, and the produced nanofiber was received by a nonwoven fabric substrate, to obtain a composite nonwoven fabric. The resulting composite nonwoven fabric was wound after being subjected to a nip treatment. In the resulting composite nonwoven fabric, more specifically, in the nonwoven fabric made of the nanofibers formed on the nonwoven fabric substrate, the average fiber diameter of the nanofibers was 790 nm, and the number of fibers having fiber diameters ranging from 2 times up to 10 times the average fiber diameter was 12% of the total number of fibers. The porosity of the nonwoven fabric was 85%.

The air filter test was carried out using the resulting composite nonwoven fabric (basis weight of nanofibers: 6 g/m$^2$). The initial collection efficiency was 60%, and the initial pressure loss was 55 Pa. In the service life test, the time until the pressure loss increases by 150 Pa from the initial pressure loss was 401 minutes.

Example 3-3

A multifilament (830 dtex, 15 filaments) made of polypropylene was prepared as a multifilament, which is a raw filament. An orifice having a straightening portion with the inner diameter of 0.9 mm and the length of 1.8 mm, was used, and 30 orifices were arranged at 10-mm intervals. The orifice coverage was set to 19%, the multifilament was fed at 0.6 m/min in a state in which the degree of vacuum of the drawing chamber was 10 kPa. The multifilament was irradiated with an 800 W, 3 mm×30 mm rectangular laser so that the center position of a molten portion of the multifilament was located 3.4 mm below the orifice. At this time, the multifilament vibrated at an orifice outlet at a vibration angle of 28 degrees, and the produced nanofiber was received by a nonwoven fabric substrate, to obtain a composite nonwoven fabric. The resulting composite nonwoven fabric was wound after being subjected to a nip treatment. In the resulting composite nonwoven fabric, more specifically, in the nonwoven fabric made of the nanofibers formed on the nonwoven fabric substrate, the average fiber diameter of the nanofibers was 820 nm, and the number of fibers having fiber diameters ranging from 2 times up to 10 times the average fiber diameter was 20% of the total number of fibers. The porosity of the nonwoven fabric was 85%.

The air filter test was carried out using the resulting composite nonwoven fabric (basis weight of nanofibers: 6 g/m$^2$). The initial collection efficiency was 53%, and the initial pressure loss was 47 Pa. In the service life test, the time until the pressure loss increases by 150 Pa from the initial pressure loss was 463 minutes.

Comparative Example 3

A multifilament (830 dtex, 15 filaments) made of polypropylene was prepared as a multifilament, which is a raw filament. An orifice having a straightening portion with the inner diameter of 0.9 mm and the length of 0.9 mm, was used, and 30 orifices were arranged at 10-mm intervals. The orifice coverage was set to 19%, the multifilament was fed at 0.8 m/min in a state in which the degree of vacuum of the drawing chamber was 10 kPa. The multifilament was irradiated with an 800 W, 3 mm×30 mm rectangular laser so that the center position of a molten portion of the multifilament was located 3.2 mm below the orifice. At this time, the multifilament vibrated at an orifice outlet at a vibration angle of 28 degrees, and the produced nanofiber was received by a nonwoven fabric substrate, to obtain a composite nonwoven fabric. The resulting composite nonwoven fabric was wound after being subjected to a nip treatment. In the resulting composite nonwoven fabric, more specifically, in the nonwoven fabric made of the nanofibers formed on the nonwoven fabric substrate, the average fiber diameter of the nanofibers was 830 nm, and the number of fibers having fiber diameters ranging from 2 times up to 10 times the average fiber diameter was 28% of the total number of fibers. The porosity of the nonwoven fabric was 85%.

The air filter test was carried out using the resulting composite nonwoven fabric (basis weight of nanofibers: 6 g/m$^2$). The initial collection efficiency was 38%, and the initial pressure loss was 30 Pa. In the service life test, the time until the pressure loss increases by 150 Pa from the initial pressure loss was 674 minutes.

From the results of the air filter tests using Examples 3-1 to 3-3 and Comparative Example 3, it was found that the rate of change of each of the initial collection efficiency, the initial pressure loss, and the time required until the pressure loss increases, increases when the ratio of thick fibers exceeds 20%. In particular, regarding the initial collection efficiency, the initial collection efficiencies in Examples 3-1 to 3-3 exceeded 50%, whereas in Comparative Example 3, the initial collection efficiency was low and in the 30% level, being largely different from those of Examples 3-1 to 3-3.

From the above, when a nonwoven fabric including constituent fibers with an average fiber diameter of approximately 800 nm and a porosity of 85% (some variation can be tolerated), is applied to an air filter, it may be preferable to set the ratio of thick fibers to be in a range of 2 to 20%.

Example 4-1

A multifilament (830 dtex, 15 filaments) made of polypropylene was prepared as a multifilament, which is a raw filament. An orifice having a straightening portion with the inner diameter of 0.9 mm and the length of 3.6 mm, was used, and 30 orifices were arranged at 10-mm intervals. The orifice coverage was set to 19%, the multifilament was fed at 0.6 m/min in a state in which the degree of vacuum of the drawing chamber was 30 kPa. The multifilament was irradiated with an 800 W, 3 mm×30 mm rectangular laser so that the center position of a molten portion of the multifilament was located 3.8 mm below the orifice. At this time, the multifilament vibrated at an orifice outlet at a vibration angle of 24 degrees, and the produced nanofiber was received by a nonwoven fabric substrate, to obtain a composite nonwoven fabric. The resulting composite nonwoven fabric was wound after being subjected to a nip treatment. In the resulting composite nonwoven fabric, more specifically, in the nonwoven fabric made of the nanofibers formed on the nonwoven fabric substrate, the average fiber diameter of the nanofibers was 810 nm, and the number of fibers having fiber diameters ranging from 2 times up to 10 times the average fiber diameter was 2% of the total number of fibers. The porosity of the nonwoven fabric was 93%.

The air filter test was carried out using the resulting composite nonwoven fabric (basis weight of nanofibers: 6 g/m$^2$). The initial collection efficiency was 45%, and the initial pressure loss was 42 Pa. In the service life test, the time until the pressure loss increases by 150 Pa from the initial pressure loss was 542 minutes.

Example 4-2

A multifilament (830 dtex, 15 filaments) made of polypropylene was prepared as a multifilament, which is a raw filament. An orifice having a straightening portion with the inner diameter of 0.9 mm and the length of 2.7 mm, was used, and 30 orifices were arranged at 10-mm intervals. The orifice coverage was set to 19%, the multifilament was fed at 0.6 m/min in a state in which the degree of vacuum of the drawing chamber was 20 kPa. The multifilament was irradiated with an 800 W, 3 mm×30 mm rectangular laser so that the center position of a molten portion of the multifilament was located 3.6 mm below the orifice. At this time, the multifilament vibrated at an orifice outlet at a vibration angle of 28 degrees, and the produced nanofiber was received by a nonwoven fabric substrate, to obtain a composite nonwoven fabric. The resulting composite nonwoven fabric was wound after being subjected to a nip treatment. In the resulting composite nonwoven fabric, more specifically, in the nonwoven fabric made of the nanofibers formed on the nonwoven fabric substrate, the average fiber diameter of the nanofibers was 790 nm, and the number of fibers having fiber diameters ranging from 2 times up to 10 times the average fiber diameter was 12% of the total number of fibers. The porosity of the nonwoven fabric was 93%.

The air filter test was carried out using the resulting composite nonwoven fabric (basis weight of nanofibers: 6 g/m$^2$). The initial collection efficiency was 39%, and the initial pressure loss was 55 Pa. In the service life test, the time until the pressure loss increases by 150 Pa from the initial pressure loss was 591 minutes.

Example 4-3

A multifilament (830 dtex, 15 filaments) made of polypropylene was prepared as a multifilament, which is a raw filament. An orifice having a straightening portion with the inner diameter of 0.9 mm and the length of 1.8 mm, was used, and 30 orifices were arranged at 10-mm intervals. The orifice coverage was set to 19%, the multifilament was fed at 0.6 m/min in a state in which the degree of vacuum of the drawing chamber was 10 kPa. The multifilament was irradiated with an 800 W, 3 mm×30 mm rectangular laser so that the center position of a molten portion of the multifilament was located 3.4 mm below the orifice. At this time, the multifilament vibrated at an orifice outlet at a vibration angle of 28 degrees, and the produced nanofiber was received by a nonwoven fabric substrate, to obtain a composite nonwoven fabric. The resulting composite nonwoven fabric was wound after being subjected to a nip treatment. In the resulting composite nonwoven fabric, more specifically, in the nonwoven fabric made of the nanofibers formed on the nonwoven fabric substrate, the average fiber diameter of the nanofibers was 820 nm, and the number of fibers having fiber diameters ranging from 2 times up to 10 times the average fiber diameter was 20% of the total number of fibers. The porosity of the nonwoven fabric was 93%.

The air filter test was carried out using the resulting composite nonwoven fabric (basis weight of nanofibers: 6 g/m$^2$). The initial collection efficiency was 36%, and the initial pressure loss was 36 Pa. In the service life test, the time until the pressure loss increases by 150 Pa from the initial pressure loss was 689 minutes.

Comparative Example 4

A multifilament (830 dtex, 15 filaments) made of polypropylene was prepared as a multifilament, which is a raw filament. An orifice having a straightening portion with the inner diameter of 0.9 mm and the length of 0.9 mm, was used, and 30 orifices were arranged at 10-mm intervals. The orifice coverage was set to 19%, the multifilament was fed at 0.8 m/min in a state in which the degree of vacuum of the drawing chamber was 10 kPa. The multifilament was irradiated with an 800 W, 3 mm×30 mm rectangular laser so that the center position of a molten portion of the multifilament was located 3.2 mm below the orifice. At this time, the multifilament vibrated at an orifice outlet at a vibration angle of 28 degrees, and the produced nanofiber was received by a nonwoven fabric substrate, to obtain a composite nonwoven fabric. The resulting composite nonwoven fabric was wound after being subjected to a nip treatment. In the resulting composite nonwoven fabric, more specifically, in the nonwoven fabric made of the nanofibers formed on the nonwoven fabric substrate, the average fiber diameter of the nanofibers was 830 nm, and the number of fibers having fiber diameters ranging from 2 times up to 10 times the average fiber diameter was 28% of the total number of fibers. The porosity of the nonwoven fabric was 93%.

The air filter test was carried out using the resulting composite nonwoven fabric (basis weight of nanofibers: 6 g/m$^2$). The initial collection efficiency was 26%, and the initial pressure loss was 23 Pa. In the service life test, the time until the pressure loss increases by 150 Pa from the initial pressure loss was 891 minutes.

From the results of the air filter tests using Examples 4-1 to 4-3 and Comparative Example 4, it was found that the rate of change of each of the initial collection efficiency, the initial pressure loss, and the time required until the pressure loss increases, increases when the ratio of thick fibers exceeds 20%. In particular, regarding the initial collection efficiency, the initial collection efficiencies in Examples 4-1 to 4-3 are approximately 40%, whereas in Comparative Example 4, the initial collection efficiency was low and in the 20% level, being largely different from those of Examples 4-1 to 4-3.

From the above, when a nonwoven fabric including constituent fibers with an average fiber diameter of approximately 800 nm and having a porosity is 93% (some variation can be tolerated), is applied to an air filter, it may be preferable to set the ratio of thick fibers to be in a range of 2 to 20%.

The nonwoven fabrics in Examples 1-1 to 1-4, Comparative Example 1-2, Examples 2-1 to 2-4, and Comparative Example 2 are a nonwoven fabric made of constituent fibers having an average fiber diameter in a range of 300 to 400 nm, and consequently, a nonwoven fabric made of constituent fibers having an average fiber diameter of less than 0.5 μm is considered to provide results similar to the results obtained in Examples 1-1 to 1-4, Comparative Example 1-2, Examples 2-1 to 2-4, and Comparative Example 2. Furthermore, the nonwoven fabrics in Examples 3-1 to 3-3, Comparative Example 3, Examples 4-1 to 4-3, and Comparative Example 4 are a nonwoven fabric made of constituent fibers having an average fiber diameter of approximately 800 nm, and consequently, a nonwoven fabric made of constituent fibers having an average fiber diameter in a range of 0.5 μm to 1 μm is considered to provide results similar to the results obtained in Examples 3-1 to 3-3, Comparative Example 3, Examples 4-1 to 4-3, and Comparative Example 4.

Thus, a nonwoven fabric in which constituent fibers thereof have an average fiber diameter of less than 1 μm and the number of fibers having fiber diameters ranging from 2 times up to 10 times the average fiber diameter is in a range of 2 to 20% of the total number of the fibers, is preferable to a nonwoven fabric for an air filter, and is capable of achieving high collection efficiency and extended service life of the air filter by appropriately selecting a nonwoven fabric depending on the matter to be collected. In particular, a nonwoven fabric in which constituent fibers thereof have an average fiber diameter of less than 0.5 μm, the number of fibers having fiber diameters ranging from 2 times up to 10 times the average fiber diameter is in a range of 2 to 20% of the total number of the fibers, and the porosity is 85% (some variation can be tolerated), can achieve collection efficiency that is comparable to that of a nanofiber nonwoven fabric manufactured by the electrospinning method, while greatly improving the pressure loss and the service life.

Furthermore, for example, a first nonwoven fabric in which constituent fibers thereof have an average fiber diameter of less than 0.5 μm, and the number of fibers having fiber diameters ranging from 2 times up to 10 times the average fiber diameter is in a range of 2 to 20% of the total number of the fibers, and a second nonwoven fabric in which constituent fibers thereof have an average fiber diameter in a range of 0.5 µm to 1 µm, and the number of fibers having fiber diameters ranging from 2 times to 10 times the average fiber diameter is in a range of 2 to 20% of the total number of the fibers, may be laminated and then formed into an air filter. This can result in high collection efficiency and extended service life of the air filter in a case in which the particle-size distribution of matter to be collected is broad, for example.

In the foregoing, a case in which the nonwoven fabric according to the present invention is used to form an air filter has been described. However, the nonwoven fabric according to the present invention may be used not only for air filters but also for various other applications. For example, the nonwoven fabric according to the present invention may be applied to filters other than the air filter (liquid filters, molecular filters), wipers (wet wipers, dry wipers), diapers, tea bags, separators of various batteries, roofing, gauze (face masks), towels, coated base cloth, sanitary products, synthetic leathers, waterproof base materials, insulating materials, water absorbing sheets, masks, oil adsorption sheets, sterilized packaging materials, protective clothing (bacteria, radioactive substance) (air resistance minimal, aerosol trapping, antibiotic, antimicrobial), interfacings for clothing, heat retaining materials (nanotextile), capacitors, adsorbents, sound absorbing materials, sound insulation materials, catalyst supports (hydrogen storage), electro-magnetic interference shields, base materials for medical use (base materials for regenerative therapy, membranes for skin, tubes for vessel), engine filters, insect repellent container, moisture-permeable and waterproof sheets, sensor base cloth (temperature sensors, pressure sensors, biochemical sensors).

The invention claimed is:

1. An air filter comprising a nonwoven fabric, wherein the nonwoven fabric is constituted by constituent fibers produced by irradiating a raw filament that is a thermoplastic resin with a laser, and by melting, vibrating, and drawing the raw filament, wherein the constituent fibers of the nonwoven fabric have an average fiber diameter of less than 1 µm and the number of fibers having fiber diameters ranging from 2 times up to 10 times an average fiber diameter of the constituent fibers is in a range of 2 to 20% of a total number of the constituent fibers.

2. The air filter according to claim 1, wherein the constituent fibers of the nonwoven fabric have an average fiber diameter of less than 0.5 µm.

3. The air filter according to claim 1, wherein the nonwoven fabric comprises:
a first nonwoven fabric that is formed so that constituent fibers of the first nonwoven fabric have an average fiber diameter of less than 0.5 µm, and the number of fibers having fiber diameters ranging from 2 times up to 10 times the average fiber diameter of the constituent fibers is in a range of 2 to 20% of a total number of the constituent fibers; and
a second nonwoven fabric that is formed so that constituent fibers of the second nonwoven fabric have an average fiber diameter in a range of 0.5 to 1 µm, and the number of fibers having fiber diameters ranging from 2 times up to 10 times the average fiber diameter of the constituent fibers is in a range of 2 to 20% of a total number of the constituent fibers.

\* \* \* \* \*